(12) United States Patent
Noren, IV et al.

(10) Patent No.: US 10,711,677 B2
(45) Date of Patent: Jul. 14, 2020

(54) EXHAUST AFTERTREATMENT SYSTEM HAVING MIXER ASSEMBLY

(71) Applicant: Tenneco Automotive Operating Company Inc., Lake Forest, IL (US)

(72) Inventors: Lawrence J. Noren, IV, Springport, MI (US); Daniel J. Owen, Parma, MI (US); Jeffrey W. Denton, Jackson, MI (US); Attila Kovacs, Karlsruhe (DE); Eric A. Hein, Neustadt an der Weinstrasse (DE); Meng-Huang Lu, Ann Arbor, MI (US); Manoj K. Sampath, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/357,917

(22) Filed: Mar. 19, 2019

(65) Prior Publication Data

US 2019/0211733 A1 Jul. 11, 2019

Related U.S. Application Data

(63) Continuation of application No. 16/014,106, filed on Jun. 21, 2018, now Pat. No. 10,273,855, which is a
(Continued)

(51) Int. Cl.
*F01N 3/20* (2006.01)
*F01N 3/28* (2006.01)
(Continued)

(52) U.S. Cl.
CPC ........ *F01N 3/2892* (2013.01); *B01F 3/04049* (2013.01); *B01F 5/0057* (2013.01);
(Continued)

(58) Field of Classification Search
CPC .. B01F 3/04049; B01F 5/0057; B01F 5/0451; B01F 5/0688; F01N 3/2066;
(Continued)

(56) References Cited

U.S. PATENT DOCUMENTS 2,965,695 A 12/1960 Sleicher, Jr.
5,044,935 A 9/1991 Peter
(Continued)

FOREIGN PATENT DOCUMENTS

CN 101821486 A 9/2010
CN 102235211 A 11/2011
(Continued)

*Primary Examiner* — Mark A Laurenzi
*Assistant Examiner* — Dapinder Singh
(74) *Attorney, Agent, or Firm* — Harness, Dickey & Pierce, P.L.C.

(57) ABSTRACT

A mixer assembly for mixing an injected reductant with an exhaust gas output from a combustion engine comprises a mixer housing including a wall defining an exhaust passageway having a longitudinal axis. A tubular swirling device housing extends along a first axis substantially transverse to the longitudinal axis. The tubular swirling device includes a plurality of openings through which exhaust gas enters. The exhaust gas within the tubular swirling device swirls about the first axis and exits at an outlet end of the tubular swirling device. A mixing plate is positioned immediately downstream of the tubular swirling device. The mixing plate swirls the exhaust about a second axis extending parallel to the longitudinal axis.

9 Claims, 7 Drawing Sheets

Related U.S. Application Data continuation of application No. 15/677,458, filed on Aug. 15, 2017, now Pat. No. 10,047,657, which is a continuation of application No. 15/001,356, filed on Jan. 20, 2016, now Pat. No. 9,784,163.

(60) Provisional application No. 62/106,398, filed on Jan. 22, 2015.

(51) Int. Cl.
    *B01F 3/04*     (2006.01)
    *B01F 5/00*     (2006.01)
    *B01F 5/04*     (2006.01)
    *B01F 5/06*     (2006.01)

(52) U.S. Cl.
    CPC .......... *B01F 5/0451* (2013.01); *B01F 5/0688* (2013.01); *F01N 3/2066* (2013.01); *B01F 2005/0091* (2013.01); *F01N 2470/18* (2013.01); *Y02T 10/24* (2013.01)

(58) Field of Classification Search
    CPC .............. F01N 3/2892; F01N 2610/02; F01N 2610/03; Y02T 10/24; Y02T 10/47
    USPC .................................. 60/317; 366/124, 337
    See application file for complete search history.

(56) References Cited

U.S. PATENT DOCUMENTS

| | | | |
|---|---|---|---|
| 5,082,478 A * | 1/1992 | Oono | ................ F01N 3/025 55/466 |
| 5,196,655 A | 3/1993 | Woods | |
| 5,425,581 A | 6/1995 | Palm | |
| 5,504,280 A | 4/1996 | Woods | |
| 5,570,576 A | 11/1996 | Ament et al. | |
| 6,449,947 B1 | 9/2002 | Liu et al. | |
| 6,722,124 B2 | 4/2004 | Pawson et al. | |
| 6,767,378 B2 * | 7/2004 | Nishiyama | ............ F01N 3/0814 55/309 |
| 6,779,786 B2 | 8/2004 | Ruscheweyh et al. | |
| 7,581,387 B2 | 9/2009 | Bui et al. | |
| 7,581,620 B2 | 9/2009 | Woods et al. | |
| 7,814,745 B2 | 10/2010 | Levin et al. | |
| 7,905,322 B2 | 3/2011 | Woods et al. | |
| 8,033,104 B2 | 10/2011 | Zhang | |
| 8,033,714 B2 | 10/2011 | Nishioka et al. | |
| 8,181,671 B2 | 5/2012 | Butler | |
| 8,240,137 B2 | 8/2012 | Liu et al. | |
| 8,371,114 B2 | 2/2013 | Hayashi et al. | |
| 8,539,761 B2 | 9/2013 | Lebas et al. | |
| 8,661,792 B2 | 3/2014 | Greber et al. | |
| 8,695,330 B2 | 4/2014 | Davidson et al. | |
| 8,726,640 B2 | 5/2014 | Tilinski et al. | |
| 9,217,348 B2 | 12/2015 | Kimura | |
| 9,266,075 B2 | 2/2016 | Chapman et al. | |
| 9,410,464 B2 | 8/2016 | Hicks et al. | |
| 9,435,240 B2 | 9/2016 | Sampath et al. | |
| 9,453,444 B2 | 9/2016 | Fischer et al. | |
| 9,506,386 B2 | 11/2016 | Brunel | |
| 9,581,067 B2 | 2/2017 | Guilbaud et al. | |
| 9,587,543 B2 | 3/2017 | Haverkamp et al. | |
| 9,657,620 B2 | 5/2017 | Braun et al. | |
| 9,670,811 B2 | 6/2017 | De Rudder et al. | |
| 9,714,598 B2 | 7/2017 | Alano et al. | |
| 9,719,397 B2 | 8/2017 | Alano et al. | |
| 9,726,064 B2 | 8/2017 | Alano | |
| 9,784,163 B2 | 10/2017 | Noren, IV et al. | |
| 9,786,063 B2 | 10/2017 | Moon et al. | |
| 10,287,948 B1 | 5/2019 | Moulieres et al. | |
| 2002/0162322 A1 | 11/2002 | Ganzmann et al. | |
| 2003/0079467 A1 * | 5/2003 | Liu | ................. B01F 3/04049 60/286 |
| 2006/0191254 A1 | 8/2006 | Bui et al. | |
| 2007/0036694 A1 | 2/2007 | Nishioka et al. | |
| 2009/0019843 A1 | 1/2009 | Levin et al. | |
| 2011/0094206 A1 | 4/2011 | Liu et al. | |
| 2011/0308234 A1 | 12/2011 | De Rudder et al. | |
| 2013/0167516 A1 | 7/2013 | Loman | |
| 2014/0044603 A1 | 2/2014 | Greber | |
| 2014/0325967 A1 | 11/2014 | Kimura | |
| 2014/0334986 A1 | 11/2014 | Stanavich et al. | |
| 2014/0345257 A1 | 11/2014 | Levin et al. | |
| 2015/0071825 A1 | 3/2015 | Sampath | |
| 2015/0110681 A1 | 4/2015 | Ferront et al. | |
| 2015/0354432 A1 | 12/2015 | Gehrlein et al. | |
| 2016/0131007 A1 | 5/2016 | Kauderer et al. | |
| 2016/0215673 A1 | 7/2016 | Noren, IV et al. | |
| 2016/0361694 A1 | 12/2016 | Brandl et al. | |
| 2017/0056846 A1 | 3/2017 | Yu et al. | |
| 2017/0089246 A1 | 3/2017 | Greber et al. | |

FOREIGN PATENT DOCUMENTS

| | | |
|---|---|---|
| CN | 104121075 A | 10/2014 |
| DE | 202013006962 | 8/2013 |
| DE | 102012224198 A1 | 6/2014 |
| DE | 102013012909 A1 | 2/2015 |
| EP | 0555746 B1 | 9/1997 |
| EP | 1438492 B1 | 7/2007 |
| EP | 2111916 A1 | 10/2009 |
| EP | 2111916 B1 | 10/2012 |
| EP | 2652279 A1 | 10/2013 |
| EP | 2775114 B1 | 1/2016 |
| FR | 2943381 A1 | 9/2010 |
| JP | 3545712 B2 | 7/2004 |
| JP | 2011032970 A | 2/2011 |
| JP | 5046332 B2 | 10/2012 |
| JP | 5090890 B2 | 12/2012 |
| JP | 5348412 B2 | 11/2013 |
| JP | 5610120 B2 | 10/2014 |
| WO | WO-2008/074414 A1 | 6/2008 |
| WO | 2012080585 A1 | 6/2012 |
| WO | 2014051617 A1 | 4/2014 |
| WO | 2016118720 A1 | 7/2016 |

* cited by examiner

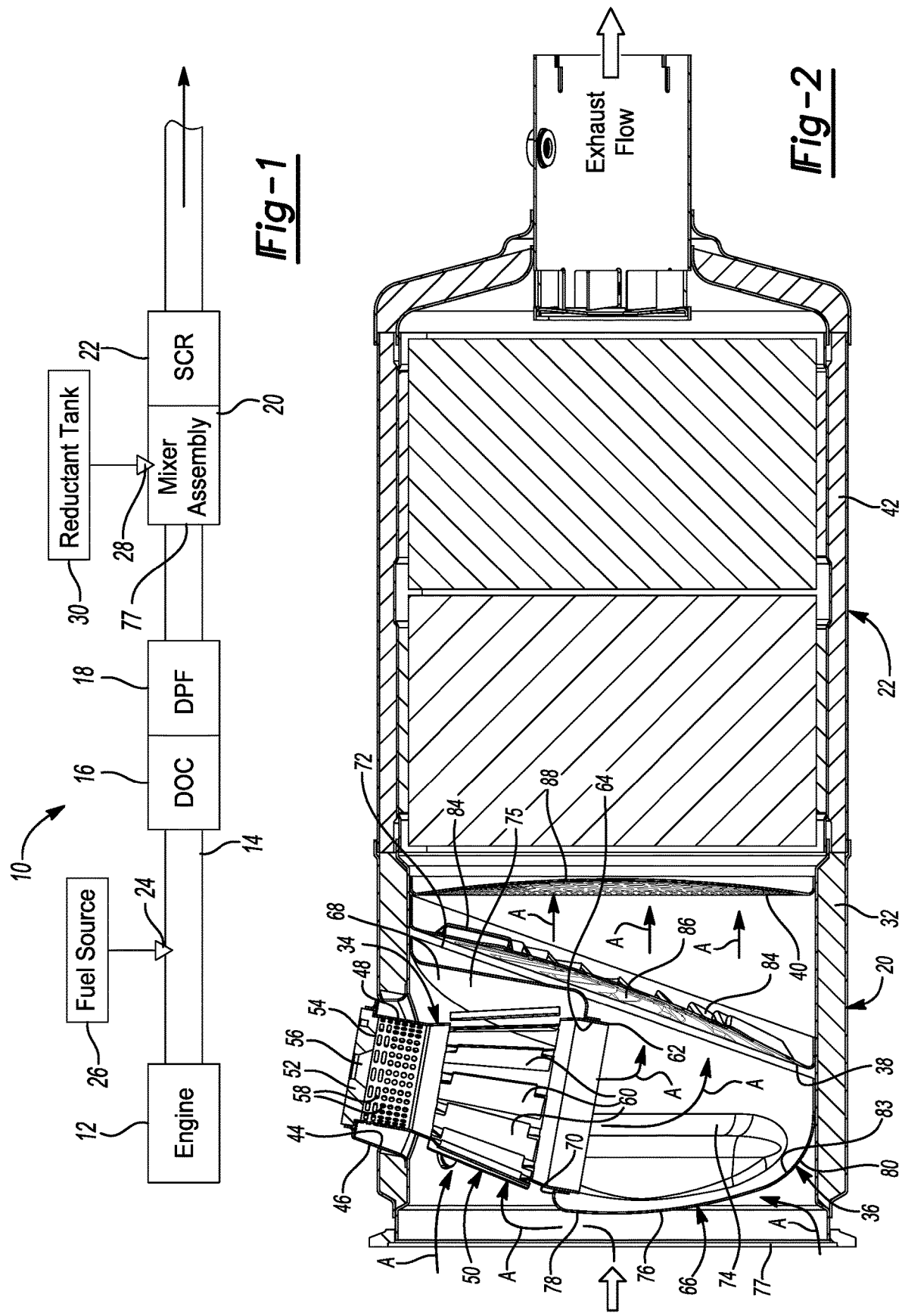

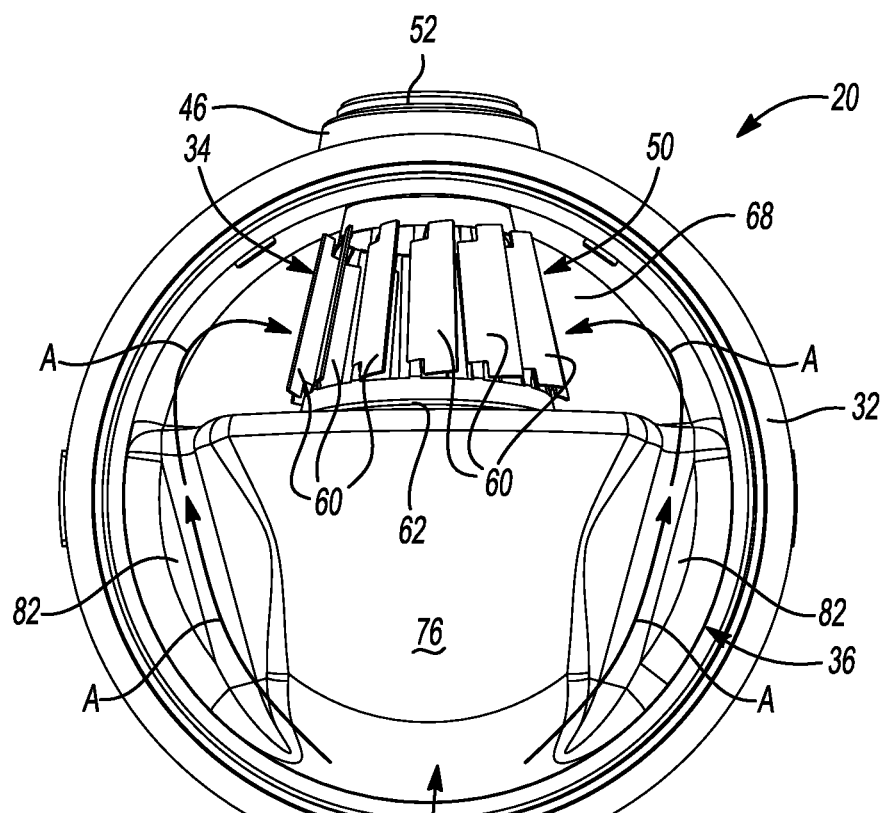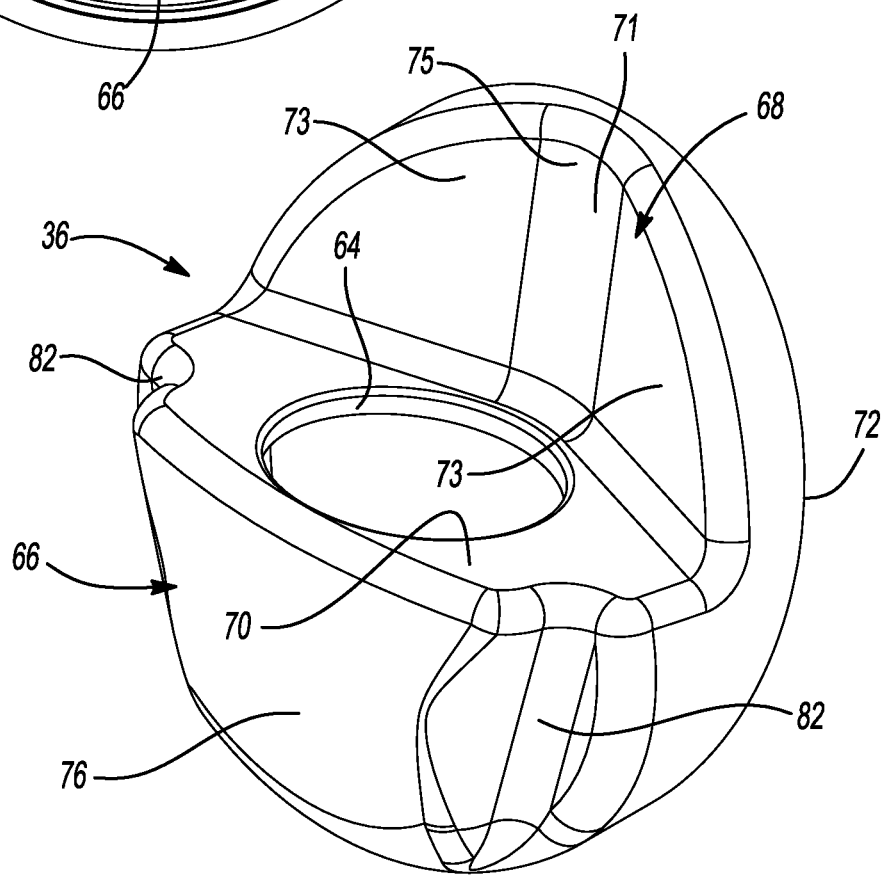

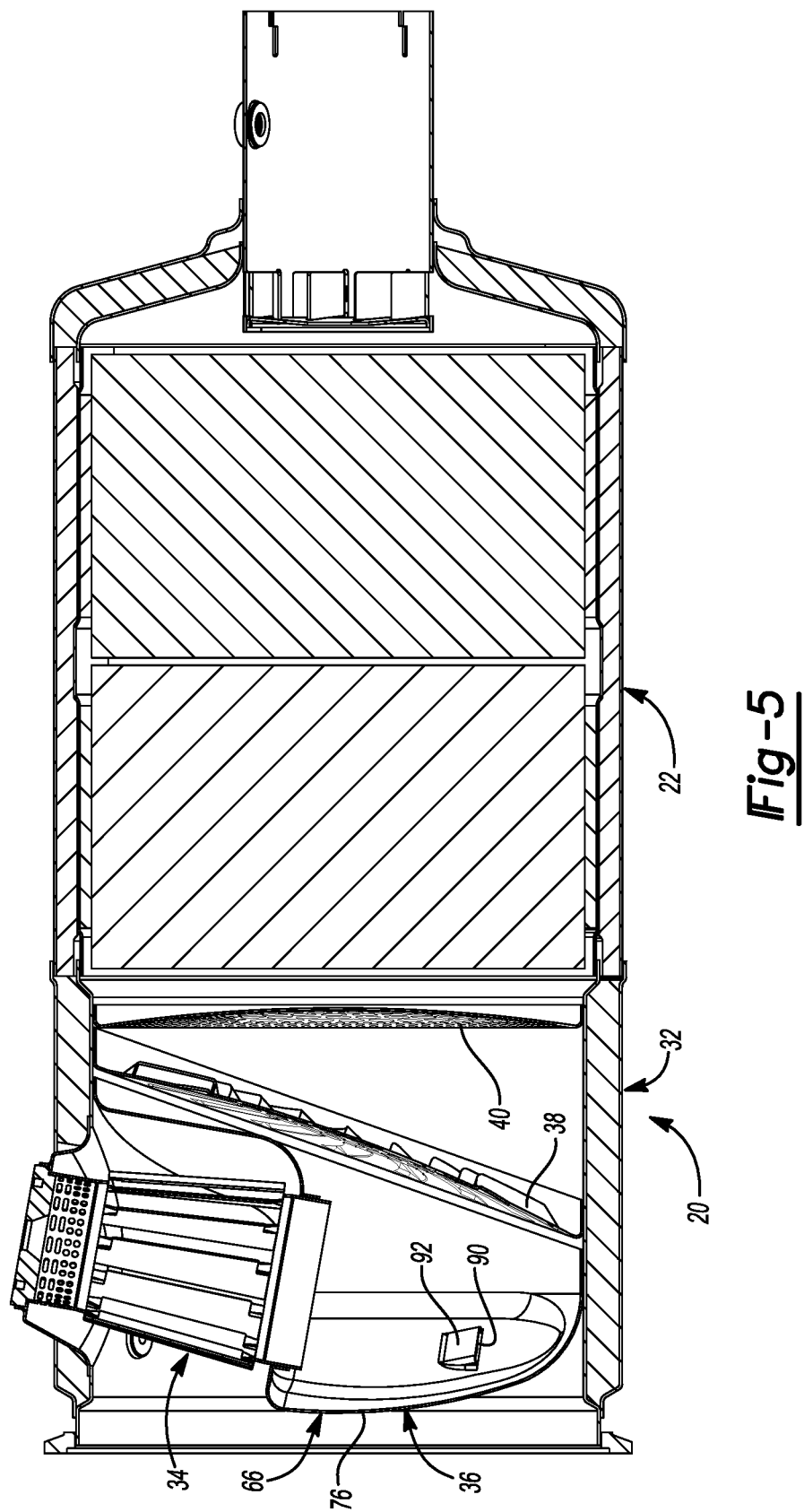

EXHAUST AFTERTREATMENT SYSTEM HAVING MIXER ASSEMBLY

CROSS-REFERENCE TO RELATED APPLICATIONS

This application is a continuation of U.S. patent application Ser. No. 16/014,106, filed on Jun. 21, 2018, which is a continuation of U.S. patent application Ser. No. 15/677,458, filed on Aug. 15, 2017, which is a continuation of U.S. patent application Ser. No. 15/001,356 filed on Jan. 20, 2016, which claims the benefit of U.S. Provisional Application No. 62/106,398, filed on Jan. 22, 2015. The entire disclosures of the above applications are incorporated herein by reference.

FIELD

The present disclosure relates to a mixer assembly for an exhaust aftertreatment system.

BACKGROUND

This section provides background information related to the present disclosure and is not necessarily prior art.

In an attempt to reduce the quantity of NOx and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include a hydrocarbon (HC) injector, a diesel oxidation catalyst (DOC), a diesel particulate filter (DPF), and a selective catalytic reduction (SCR) system.

SCR technology has been used in conjunction with reducing nitrogen oxides present in the exhaust of combustion engines. Some of these systems are constructed using urea-based technology including a container for storing a reductant (e.g., urea) and a delivery system (including an injector, for example) for transmitting the reductant from the container to the exhaust stream. A mixer is typically provided for mixing the injected reductant with the exhaust gas before the reductant reaches a catalyst with which the reductant reacts. While these systems may have performed well in the past, it may be desirable to provide an improved mixer to more efficiently and effectively mix the reductant with the exhaust stream.

SUMMARY

This section provides a general summary of the disclosure, and is not a comprehensive disclosure of its full scope or all of its features.

A mixer assembly for mixing an injected reductant with an exhaust gas output from a combustion engine comprises a mixer housing including a wall defining an exhaust passageway having a longitudinal axis. A tubular swirling device housing extends along a first axis substantially transverse to the longitudinal axis. The tubular swirling device includes a plurality of openings through which exhaust gas enters. The exhaust gas within the tubular swirling device swirls about the first axis and exits at an outlet end of the tubular swirling device. A mixing plate is positioned immediately downstream of the tubular swirling device and includes apertures through which the exhaust gas exiting the outlet end of the tubular swirling device flows. The mixing plate swirls the exhaust about a second axis extending parallel to the longitudinal axis.

An exhaust aftertreatment system may include an exhaust gas passageway and a mixer assembly. The exhaust gas passageway may receive exhaust gas output from a combustion engine. The mixer assembly may be disposed along the exhaust gas passageway and may receive the exhaust gas. The mixer assembly may include a mixer housing, a mixing bowl and an injector housing. The mixing bowl may be disposed within the mixer housing and may include an outer diametrical surface that engages an inner diametrical surface of a wall of the mixer housing. The injector housing may extend through the wall and into an aperture in the mixing bowl. The aperture may define a flow path through which at least a majority of the exhaust gas entering the mixer assembly flows. The mixing bowl may include an upstream end portion having contours directing the exhaust gas toward the injector housing.

In some configurations, the upstream end portion of the mixing bowl includes a pair of recesses that extend along lateral sides of the upstream end portion and diverge away from each other as the recesses extend toward a flange portion of the mixing bowl.

In some configurations, the upstream end portion of the mixing bowl includes a generally U-shaped recess.

In some configurations, all of the exhaust gas entering the mixer assembly flows through the aperture.

In some configurations, the injector housing is an annular member having a plurality of openings through which exhaust gas enters before flowing through the aperture in the mixing bowl. The plurality of openings may be defined by a plurality of louvers.

An injector may inject reagent (e.g., reductant or hydrocarbon fuel) into a mixing chamber defined by the injector housing and the mixing bowl. The exhaust gas and the reagent may mix with each other in the mixing chamber.

In some configurations, the exhaust aftertreatment system includes an exhaust aftertreatment component (e.g., a selective catalytic reduction catalyst or an oxidation catalyst) disposed downstream of the mixing bowl and receiving the mixture of reductant and exhaust gas.

In some configurations, the mixer assembly includes a mixing element (e.g., a mixing plate or other mixing structure) disposed between the mixing bowl and the selective catalytic reduction catalyst, the mixing element including a plurality of louvers and openings.

In some configurations, the mixing bowl includes a flange portion and a collar portion. The flange portion may be disposed between the upstream end portion and the collar portion. The aperture may extend through the flange portion and is disposed between the collar portion and an inlet of the mixer housing.

In some configurations, the collar portion is disposed further downstream than the upstream end portion.

In another form, the present disclosure provides a mixer assembly receiving exhaust gas from an engine and mixing the exhaust gas with an injected fluid. The mixer assembly may include a mixer pipe, a mixing bowl and an injector housing. The mixing bowl may be disposed within the mixer pipe and may include an outer diametrical surface that engages an inner diametrical surface of a wall of the mixer pipe. The mixing bowl may have a diameter that is equal to an inner diameter of the mixer pipe. The injector housing may receive the injected fluid and may extend through the wall and into an aperture in the mixing bowl. The aperture may define a flow path through which exhaust gas flows. The mixing bowl may include contours directing the exhaust gas toward the injector housing.

In some configurations, an upstream end portion of the mixing bowl includes a pair of recesses that extend along lateral sides of the upstream end portion and diverge away from each other as the recesses extend toward a flange portion of the mixing bowl. The aperture may be formed in the flange portion.

In some configurations, the upstream end portion of the mixing bowl includes a generally U-shaped recess.

In some configurations, all of the exhaust gas entering the mixer pipe flows through the aperture.

In some configurations, the injector housing is an annular member having a plurality of openings through which exhaust gas enters before flowing through the aperture in the mixing bowl.

In some configurations, the plurality of openings are defined by a plurality of louvers.

In some configurations, the mixer assembly includes an injector injecting the injected fluid into a mixing chamber defined by the injector housing and the mixing. The exhaust gas and the injected fluid mix with each other in the mixing chamber.

In some configurations, an outlet of the mixer pipe is connected to an inlet of a housing of a selective catalytic reduction catalyst. The selective catalytic reduction catalyst may receive the mixture of the injected fluid and exhaust gas.

In some configurations, the mixer assembly includes a mixing plate disposed between the mixing bowl and the selective catalytic reduction catalyst. The mixing plate may include a plurality of louvers and openings.

In some configurations, the mixing bowl includes a flange portion and a collar portion. The flange portion may be disposed between the upstream end portion and the collar portion. The aperture may extend through the flange portion and is disposed between the collar portion and an inlet of the mixer pipe.

In some configurations, the collar portion is disposed further downstream than the upstream end portion.

In another form, the present disclosure provides a mixer assembly receiving exhaust gas from an engine. The mixer assembly may include a mixer pipe, an injector housing and a mixing bowl. The mixer pipe may include an inlet, an outlet and a longitudinal axis extending through the inlet and the outlet. The mixing pipe may receive exhaust gas flowing in a first direction parallel to the longitudinal axis through the inlet. The exhaust gas may flow through the outlet in the first direction. The injector housing may receive a reagent and extend into the mixer pipe between the inlet and outlet. The mixing bowl may be disposed within the mixer pipe between the inlet and the outlet and may include an aperture receiving a portion of the injector housing. The mixing bowl may include a first contoured surface directing the exhaust gas downstream of the inlet in a second direction toward the injector housing. The second direction may be angled relative to the first direction or substantially orthogonal to the first direction. The mixing bowl may include a second contoured surface downstream of the first contoured surface directing exhaust gas through the aperture in a third direction opposite the second direction.

In some configurations, the mixing bowl includes an outer diametrical surface that engages an inner diametrical surface of a wall of the mixer pipe. The mixing bowl may have a diameter that is equal to an inner diameter of the mixer pipe.

In some configurations, the first contoured surface is defined by an upstream end portion of the mixing bowl having a pair of recesses that extend along lateral sides of the upstream end portion and diverge away from each other as the recesses extend toward a flange portion of the mixing bowl. The aperture is formed in the flange portion.

In some configurations, the second contoured surface is defined by a collar portion of the mixing bowl, the aperture extends through the flange portion of the mixing bowl and is disposed between the collar portion and the upstream end portion.

In some configurations, the first contoured surface is defined by an upstream end portion of the mixing bowl having a generally U-shaped recess.

In some configurations, all of the exhaust gas entering the mixer pipe through the inlet flows through the aperture.

In some configurations, the injector housing is an annular member having a plurality of openings through which exhaust gas enters before flowing through the aperture in the mixing bowl.

In some configurations, the plurality of openings are defined by a plurality of louvers.

In some configurations, the mixer assembly includes an injector injecting reductant into a mixing chamber defined by the injector housing and the mixing bowl. The exhaust gas and the reductant may mix with each other in the mixing chamber.

In some configurations, the outlet of the mixer pipe is connected to an inlet of a housing of a selective catalytic reduction catalyst. The selective catalytic reduction catalyst may receive the mixture of the reductant and exhaust gas.

In some configurations, the mixer assembly includes a mixing plate disposed between the mixing bowl and the selective catalytic reduction catalyst. The mixing plate may include a plurality of louvers and openings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic representation of an engine and exhaust aftertreatment system having a mixer assembly according to the principles of the present disclosure;

FIG. 2 is a cross-sectional view of a portion of the aftertreatment system including the mixer assembly;

FIG. 3 is an end view of the mixer assembly;

FIG. 4 is a perspective view of a mixing bowl of the mixer assembly;

FIG. 5 is a cross-sectional view of a portion of the aftertreatment system including another mixer assembly according to the principles of the present disclosure;

Corresponding reference numerals indicate corresponding parts throughout the several views of the drawings.

DETAILED DESCRIPTION

Figure 6:
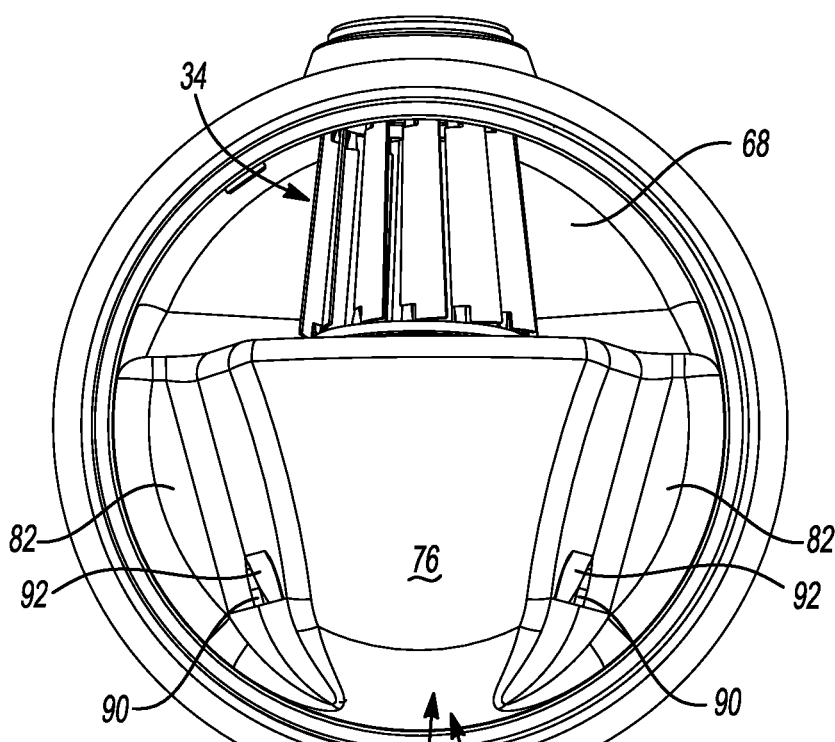
FIG. 6 is an end view of the mixer assembly of FIG. 5.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust aftertreatment system 10 is provided that may treat exhaust gas output by a combustion engine 12. The exhaust aftertreatment system 10 may include an exhaust gas passageway 14, an oxidation catalyst (e.g., a diesel oxidation catalyst or DOC) 16, a filter (e.g., a diesel particulate filter (DPF)) 18, a mixer assembly 20 and a selective catalytic reduction (SCR) catalyst 22. The DOC 16, filter 18, mixer assembly 20 and SCR catalyst 22 are disposed within the exhaust gas passageway 14 such that some or all of the that exhaust gas output from engine 12 flows therethrough.

A hydrocarbon (HC) injector 24 may be disposed at least partially within the exhaust gas passageway 14 upstream of the DOC 16. The HC injector 24 may receive hydrocarbon fuel from a fuel source 26 and may inject into the fuel into the stream of exhaust gas upstream of the DOC 16. A burner (not shown) may be disposed at least partially within the exhaust gas passageway 14 upstream of the DOC 16 at or adjacent the HC injector 24. The burner may ignite the fuel injected by the HC injector 24 to regenerate the DOC 16 and/or the filter 18.

A reductant injector 28 may be disposed adjacent to or partially within the mixer assembly 20 upstream of the SCR catalyst 22. The reductant injector 28 may receive a reductant (e.g., urea) from a reductant tank 30 and inject the reductant into an exhaust stream in the mixer assembly 20. As will be described in more detail below, reductant may mix with exhaust gas within the mixer assembly 20 prior to flowing through the SCR catalyst 22.

Referring now to FIGS. 2-4, the mixer assembly 20 may include a mixer housing or pipe 32, an injector housing 34, a mixing bowl 36, a first mixing plate 38 and a second mixing plate 40. The mixer housing 32 can be generally cylindrical and may be directly or indirectly connected to a housing 42 of the SCR catalyst 22. The mixer housing 32 may include an injector opening 44 through which the injector housing 34 and/or the reductant injector 28 may extend.

The injector housing 34 may be an annular member including a flange 46, a generally cylindrical portion 48, and a generally frustoconical portion 50. As shown in FIG. 2, a cap 52 may engage a first end 54 of the cylindrical portion 48. While not specifically shown in FIG. 2, the reductant injector 28 may extend through an aperture 56 in the cap 52 and spray reductant into the cylindrical and frustoconical portions 48, 50. The cylindrical portion 48 may include a plurality of apertures 58 extending therethrough. The frustoconical portion 50 may include a plurality of louvers 60 defining openings into the injector housing 34. A distal end 62 of the frustoconical portion 50 may engage the mixing bowl 36 and may extend through an aperture 64 in the mixing bowl 36. In some configurations, the distal end 62 may include a static mixer having louvers and apertures, for example, to provide additional turbulence.

The mixing bowl 36 may be a generally bowl-shaped structure that may be stamped and/or otherwise formed from sheet metal, for example. It will be appreciated that the mixing bowl could be formed by any suitable process and from any suitable material. The mixing bowl 36 may include an upstream end portion 66, a collar portion 68, a step or flange portion 70 and a downstream rim 72 that cooperate to define a mixing chamber 74. The flange portion 70 may be disposed between the upstream end portion 66 and the collar portion 68 and may include the aperture 64 through which the injector housing 34 extends. An outer diametrical surface of the rim 72 can be welded, fastener or pressed into engagement with the inner diametrical surface of the mixer housing 32, for example.

As shown in FIG. 4, an exterior surface 75 of the collar portion 68 (e.g., the surface of the collar portion 68 that generally faces an inlet 77 of the mixer housing 32) may be generally concave such that a central portion 71 of the exterior surface 75 is disposed further downstream than lateral portions 73 of an exterior surface 76. As shown in FIG. 2, the exterior surface 76 of the upstream end portion 66 (e.g., the surface of the upstream end portion 66 that generally faces an inlet 77 of the mixer housing 32) may be generally convex such that an upper end 78 of the exterior surface 76 is disposed further upstream than a lower end 80 of the exterior surface 76.

As shown in FIGS. 3 and 4, a pair of recesses 82 may be formed in lateral side portions of the upstream end portion 66. The recesses 82 extend along the perimeter of the upstream end portion 66 and generally diverge from each other as they extend from a lower portion of the upstream end portion 66 toward the flange portion 70. In this manner, the recesses 82 are shaped to funnel or direct exhaust gas flowing into the mixer housing 32 toward the injector housing 34 and the collar portion 68 (as indicated by arrows A in FIG. 3) so that exhaust gas will flow into the injector housing 34 (i.e., between the louvers 60 and/or through the apertures 58) and flow into the mixing chamber 74 through the aperture 64 in the flange portion 70. In the particular embodiment depicted in FIGS. 2-4, all of the exhaust gas that enters the mixer housing 32 through the inlet 77 will be directed into the injector housing 34 and through the aperture 64 as indicated by the arrows A in FIG. 2. In this manner, the exhaust gas will be thoroughly mixed with the reductant from reductant injector 28 into the injector housing 34 and in the mixing chamber 74. Mixing bowl 36 includes a curved interior or downstream surface 83 shaped in such a manner that exhaust passing through aperture 64 is redirected substantially ninety degrees to flow toward SCR 22.

The first mixing plate 38 may include a plurality of louvers 84 and apertures 86 through which the mixture of reductant and exhaust gas may flow. The second mixing plate 40 may include a plurality of apertures 88 through which the mixture of reductant and exhaust gas may flow. The first and second mixing plates 38, 40 may increase the turbulence of the flow upstream of the SCR catalyst 22 to facilitate further mixing of the exhaust gas and the reductant prior to entering the SR catalyst 22. The mixing plates 38, 40 may also spread the mixture of reductant and exhaust gas over a larger cross-sectional area so that the mixture will flow into the SCR catalyst 22 over a larger cross-sectional area. It will be appreciated that the mixer assembly 20 could include any number of mixing plates and/or static mixers configured in any desired manner. In some embodiments, the contours of the mixing bowl and/or the shape and position of one or more mixing plates 38, 40 may direct the mixture of exhaust gas and reductant away from a lower portion (from the frame of reference of FIG. 2) of the SCR catalyst 22 and toward a central region of the SCR catalyst 22.

While the mixer assembly 20 is described above as mixing exhaust gas with reductant from the reductant injector 28 and providing the mixture to the SCR catalyst 22, it will be appreciated that the mixer assembly 20 could be used in conjunction with the HC injector 24 rather than the reductant injector 28. That is, the mixer assembly 20 could be provided upstream of the DOC 16, and the HC injector 24 could inject fuel into the injector housing 34 and mixing chamber 74 to be mixed with the exhaust gas prior to being ignited.

Figure 7:
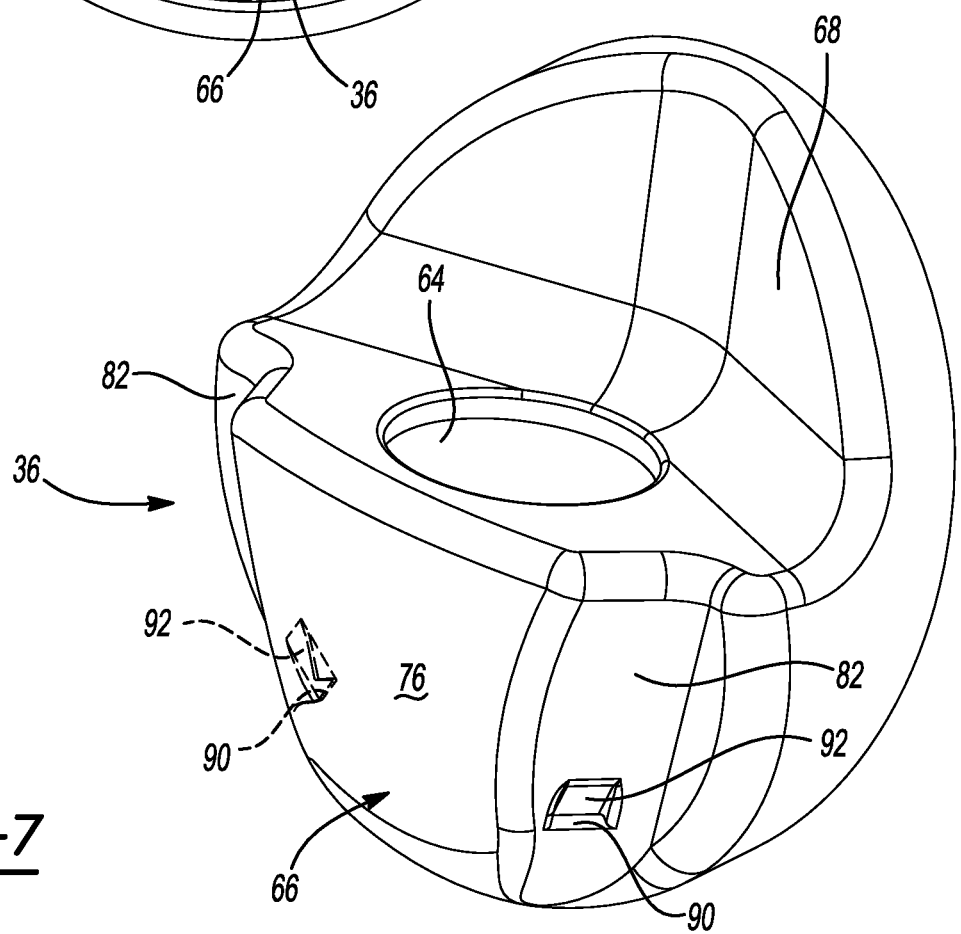
FIG. 7 is a perspective view of a mixing bowl of the mixer assembly of FIG. 5.

FIGS. 5-7 depict another configuration of the mixing bowl 36 in which apertures 90 and louvers 92 are formed in the recesses 82 to allow a relatively small portion of the exhaust gas to flow therethrough rather than flowing into the injector housing 34 and the aperture 64. Louvers 92 redirect the exhaust flowing through apertures 90 to flow along curved interior surface 83. This flow pattern minimizes the number of large urea droplets contacting surface 83. If liquid urea droplets do impinge upon surface 83, the modified flow pattern quickly causes the liquid to evaporate.

Additionally or alternatively, apertures and louvers could be formed in the exterior surface 76 between the recesses 82. Additionally or alternatively, one or more bypass apertures or passages could be formed in the mixing bowl 36 at or near the aperture 64 and/or at or near the rim 72 so that relatively small amounts of exhaust gas can bypass the injector housing 34. Additionally or alternatively, one or more bypass apertures or passages could be formed in the inner diametrical surface of the mixer housing 32 so that relatively small amounts of exhaust gas can bypass the injector housing 34 and the mixing chamber 74.

While the mixer assemblies 20 shown in FIGS. 2 and 5 are oriented horizontally, it will be appreciated that these assemblies could be oriented vertically. As shown in FIG. 2, the injector housing 34 may have an axis of rotation (i.e., a longitudinal axis) that is disposed at a non-perpendicular angle relative to the longitudinal axis of the mixer housing 32. In the vertical orientation, this configuration may be particularly advantageous in that liquid droplets can fall away from the injector 28 rather than forming deposits on the injector 28.

Figure 8:
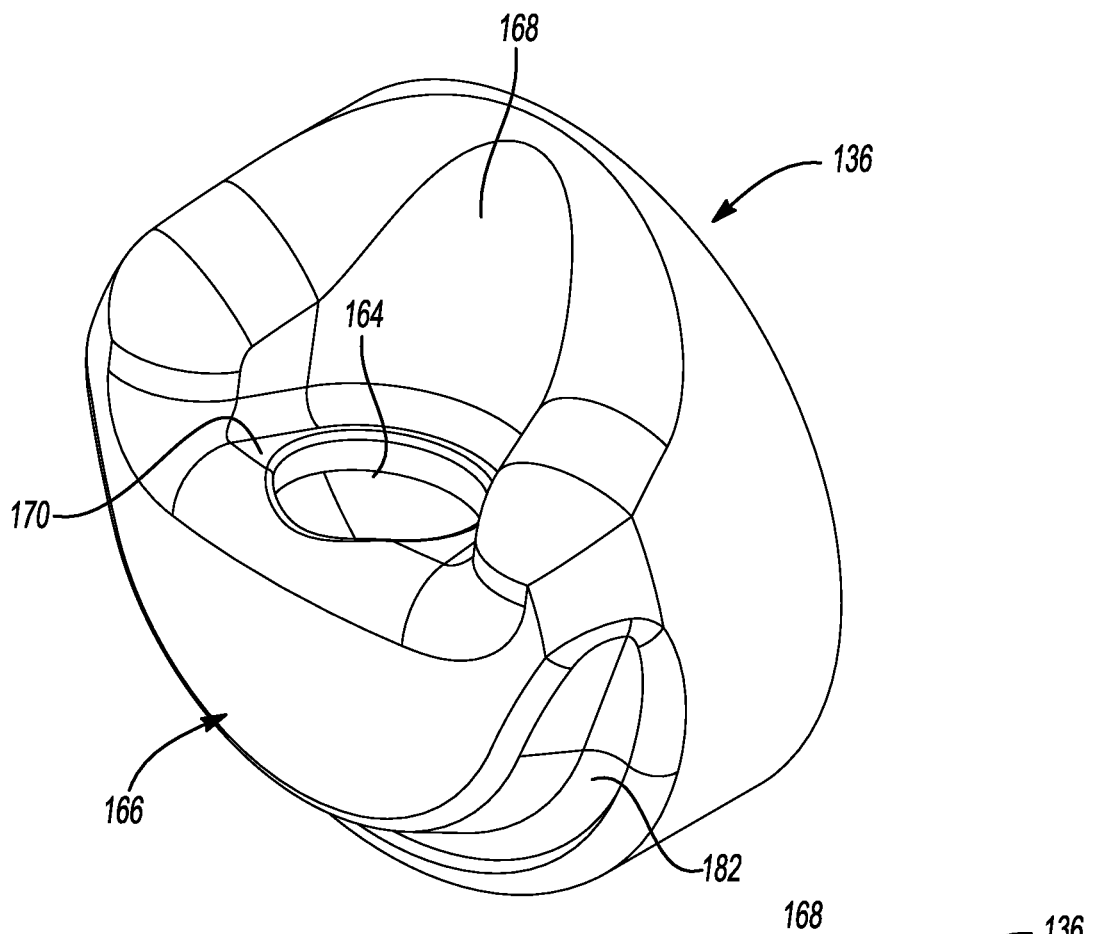
FIG. 8 is a perspective view of another mixing bowl according to the principles of the present disclosure.
Figure 9:
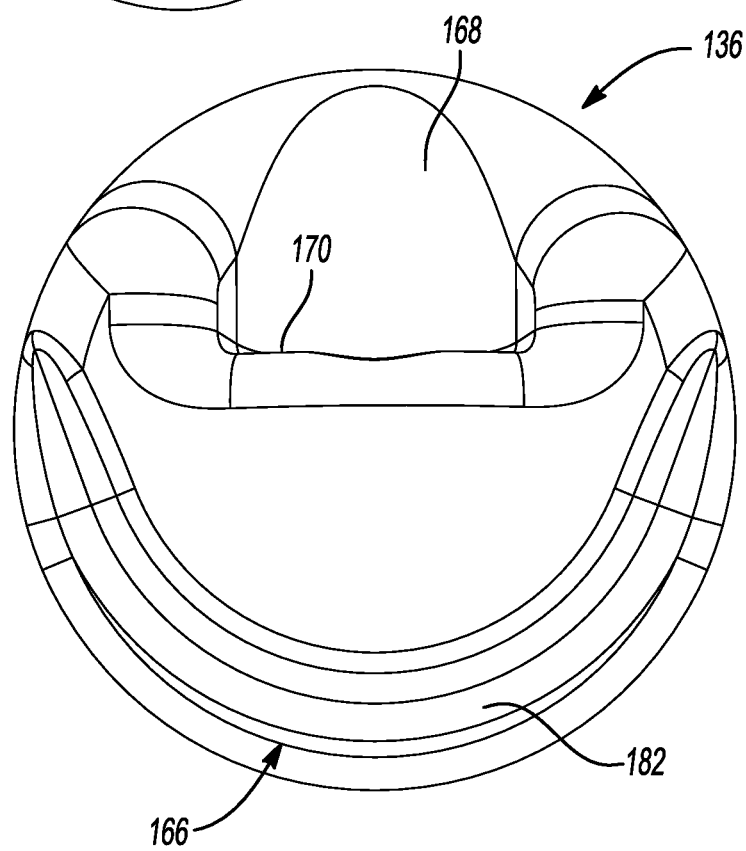
FIG. 9 is an end view of the mixing bowl of FIG. 8.

FIGS. 8 and 9 depict yet another configuration of a mixing bowl 136 that includes one continuous recess 182 in upstream end portion 166 instead of the pair of recesses 82 described above. Like the recesses 82 of the mixing bowl 36 described above, the recess 182 is shaped to funnel or direct exhaust gas outward and upward so that the exhaust gas will flow around collar portion 168 and into the injector housing 34 and through aperture 164 in flange portion 170 in a similar manner as described above and shown in FIGS. 2 and 3.

Figure 10:
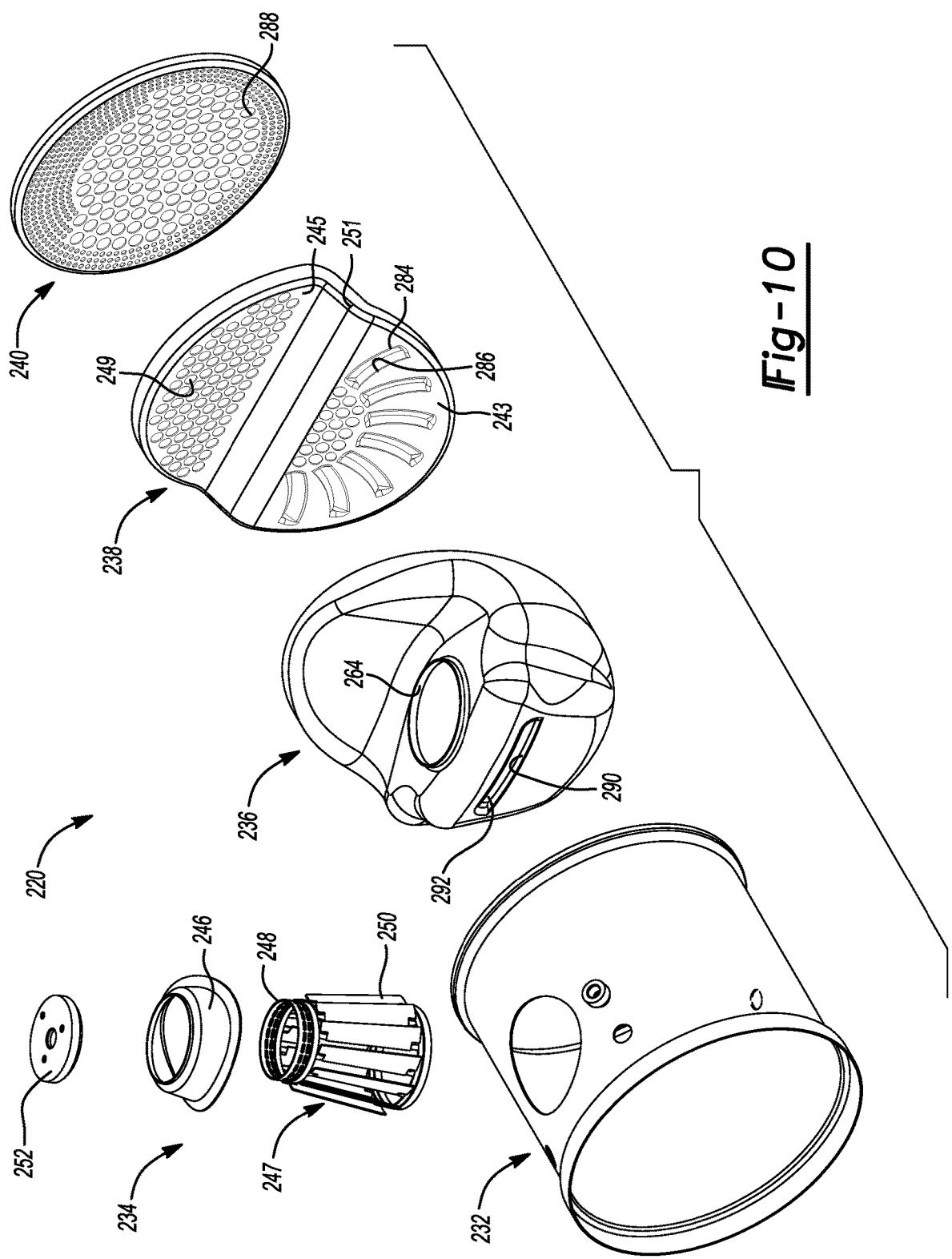
FIG. 10 is an exploded perspective view of an alternate mixer assembly.
Figure 11:
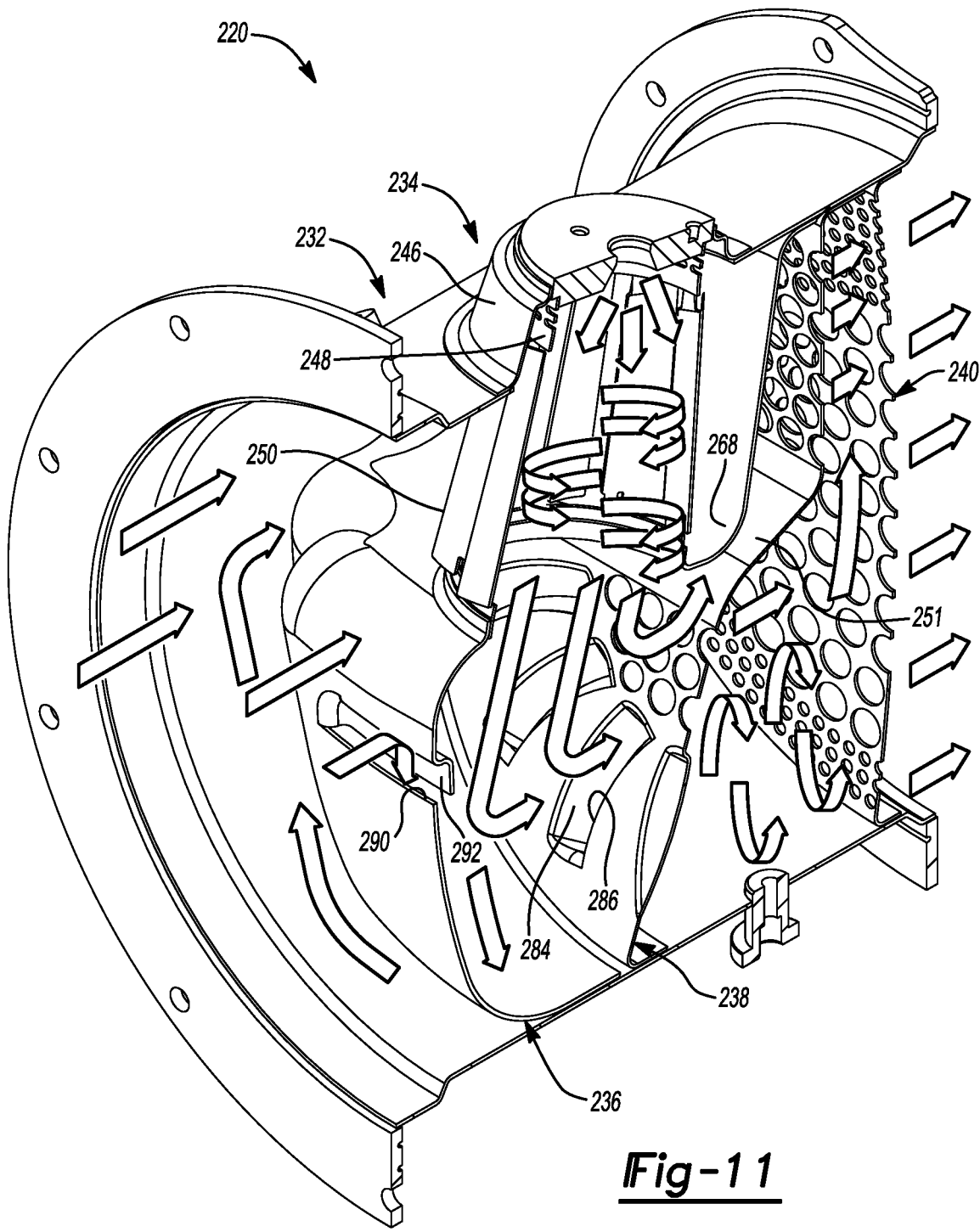
FIG. 11 is a fragmentary perspective view of the mixer depicted in FIG. 10.

FIGS. 10 and 11 depict an alternate mixer assembly 220 including a mixer housing or pipe 232, an injector housing 234, a mixing bowl 236, a first mixing plate 238, and a second mixing plate 240. Mixer housing 232 is substantially similar to previously described mixing housing 32. Similarly, injector housing 234 is substantially similar to the previously described injector housing 34. In particular, injector housing 234 includes a flange 246 coupled to a swirling device 247. Swirling device 247 includes a cylindrical portion 248 and a frustoconical portion 250. A cap 252 is fixed to flange 246 and cylindrical portion 248. Please refer to the earlier sections of the specification for greater detail.

Mixing bowl 236 is substantially similar to previously described mixing bowl 236 and the alternate configurations depicted in FIGS. 4-9. Mixing bowl 236, however, includes an aperture 290 associated with a louver 292 extending across pipe 232 a distance approximately half of the inner diameter of the pipe. Aperture 290 and louver 292 are positioned centrally within the circular cross-section of pipe 232. Exhaust gas flows through aperture 290 and is redirected by louver 292. As described in detail with relation to the other embodiments, exhaust gas also flows through apertures extending through cylindrical portion 248, frusto-conical portion 250 to pass through aperture 264 of mixing bowl 236.

First mixing plate 238 includes a stepped shape when viewed from the side such that a first portion 243 is positioned axially closer to injector housing 234 than a second portion 245. An intermediate portion 251 interconnects first portion 243 and second portion 245. Intermediate portion 251 is spaced apart from a collar portion 268 of mixing bowl 236 to define a pinch point or orifice therebetween. The orifice generates a region of increased gas velocity to entrain the smaller droplets of reductant and urge these droplets toward second portion 245 positioned on the same side of pipe as the injector. First portion 243 includes a plurality of louvers 284 and apertures 286 through which the mixture of reductant and exhaust gas may flow. Second portion 245 includes a plurality of substantially cylindrically-shaped apertures 249 provided to allow reductant and exhaust gas to flow therethrough. Louvers 284 are substantially crescent shaped and arranged in an arc to create a swirling exhaust gas motion. As larger droplets of reductant attempt to increase their distance from the injector, the swirling exhaust gas pattern generated by louvers 284 urges the droplets toward the injector such that they evaporate near the center of the pipe 232.

Second mixing plate 240 may include a plurality of apertures 288 through which the mixture of reductant and exhaust gas may flow. The shape, size, and position of various apertures 288 are defined to further mix the exhaust gas and reductant prior to entering a downstream catalyst. Mixing plates 238, 240 may distribute the mixture of reductant and exhaust gas over a desired inlet area of the downstream catalyst to optimize efficiency of catalyst operation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mixer assembly for mixing an injected reductant with an exhaust gas output from a combustion engine, comprising:

a tubular housing including a reductant inlet, an exhaust gas inlet and an exhaust gas outlet, the tubular housing defining a longitudinal axis along which the exhaust enters the housing;

a diversion plate positioned within the housing downstream of the exhaust gas inlet and the reductant inlet and being intersected by the longitudinal axis, the diversion plate urging a first portion of the exhaust gas in a first transverse direction and a second portion of the exhaust gas in a second and opposite transverse direction, wherein the first and second portions of the exhaust gas are urged toward the reductant inlet; and a mixing plate positioned within the housing immediately downstream of the diversion plate, the mixing plate including a surface shaped to swirl the exhaust gas and the reductant about an axis extending parallel to the longitudinal axis.

2. The mixer assembly of claim 1, further including a shield fixed to the diversion plate to block the exhaust gas from directly flowing toward the injected reductant.

3. The mixer assembly of claim 2, wherein the shield is fixed to an outer wall of the housing.

4. The mixer assembly of claim 1, wherein the mixing plate includes apertures of different size and shape to allow mixed exhaust gas and injected reductant to pass therethrough.

5. The mixer assembly of claim 1, further including an injector mount fixed to an outer wall of the housing and the reductant inlet.

6. The mixer assembly of claim 1, wherein the reductant inlet is positioned on a side of the tubular housing.

7. A mixer assembly for mixing an injected reductant with an exhaust gas output from a combustion engine, comprising:

a tubular housing including a reductant inlet, an exhaust gas inlet and an exhaust gas outlet, the tubular housing defining a longitudinal axis along which the exhaust enters the housing;

an upstream mixing element including a convex portion positioned between a first recess and a second recess, the recesses being shaped to direct the exhaust gas through apertures extending through the upstream mixing element at positions closer to the reductant inlet than an opposite side of the tubular housing, wherein a downstream face of upstream mixing element at least partially defines a reductant receiving duct that extends transversely across the tubular housing; and a downstream mixing element positioned immediately downstream from the upstream mixing element, the downstream mixing element including an upstream surface at least partially defining the reductant receiving duct, the downstream mixing element including curved surfaces having spaced apart exit ducts supplying mixed exhaust gas and injected reductant to the housing exhaust gas outlet.

8. The mixer assembly of claim 7, wherein the exit ducts are positioned to impart a swirling motion to the exhaust gas.

9. The mixer assembly of claim 7, wherein the downstream mixing element includes apertures of different size, wherein at least one of the apertures is bounded by a louver to change the direction of exhaust gas flow.

* * * * *